April 19, 1938. H. L. YOUNG 2,114,758
SHRINKAGE CONVEYER FOR RUBBER STRIPS
Filed Jan. 6, 1936
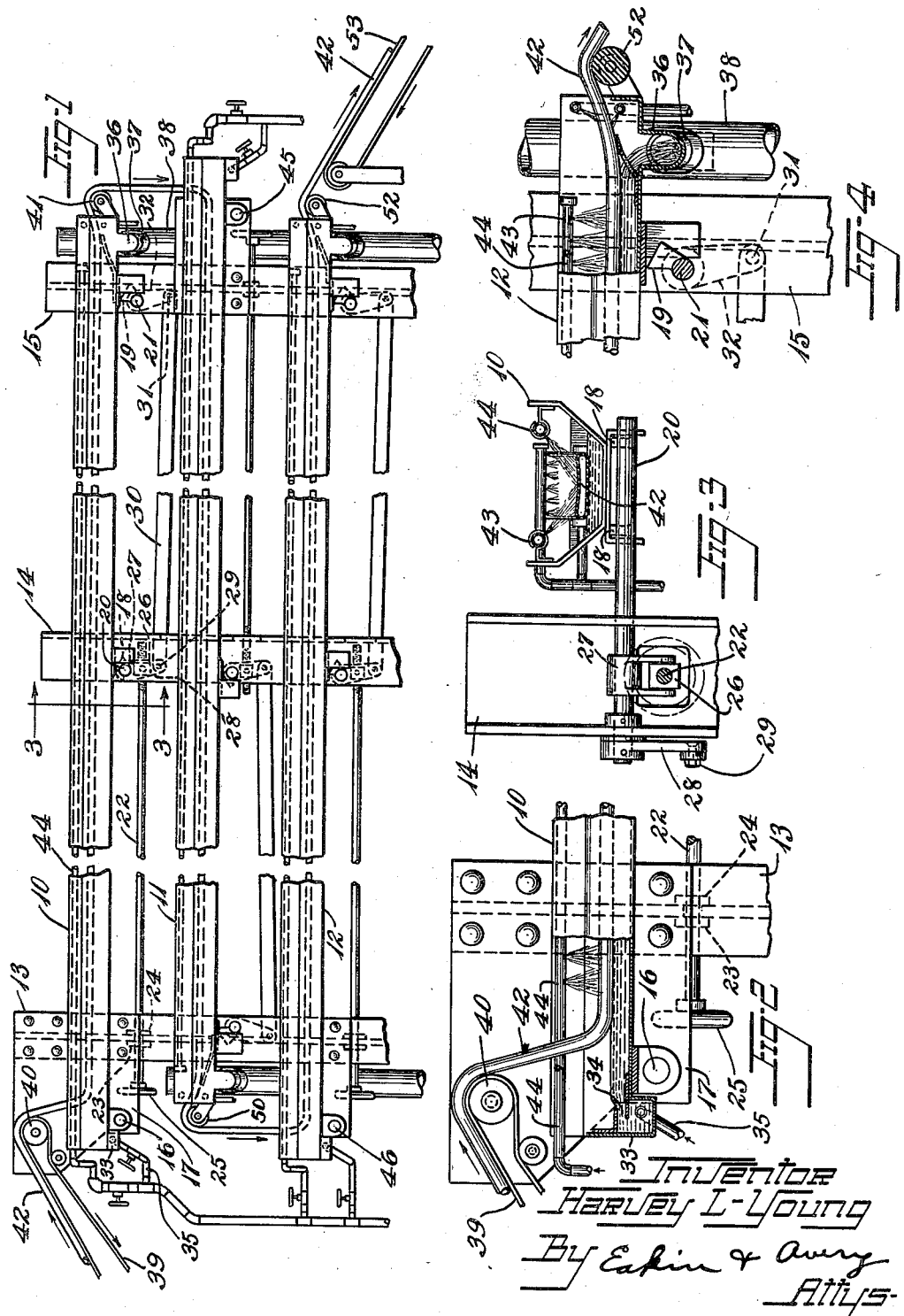

Patented Apr. 19, 1938

2,114,758

UNITED STATES PATENT OFFICE 2,114,758

SHRINKAGE CONVEYER FOR RUBBER STRIPS

Harvey L. Young, Akron, Ohio, assignor to The B. F. Goodrich Company, New York, N. Y., a corporation of New York Application January 6, 1936, Serial No. 57,801

6 Claims. (Cl. 18—2)

This invention relates to methods and apparatus for treating a continuous length of plastic material in strip form for the purpose of shrinking the same, and it is especially useful in the treatment of extruded or calendered strips of unvulcanized rubber.

The principal objects of the invention are to provide economy and efficiency in the handling of strip plastic material as it is permitted to shrink, and to provide simplicity of apparatus for this purpose.

Other objects will appear from the following description and the accompanying drawing.

Of the drawing:

Fig. 1 is a side elevation of the preferred form of apparatus, the view being broken and parts eliminated in order to shorten the figure.

Fig. 2 is a fragmentary sectional view of the input end of the device, parts being broken away.

Fig. 3 is a sectional detail view taken on line 3—3 of Fig. 1.

Fig. 4 is a fragmentary sectional view of the delivery end of the device, parts being broken away.

Referring to the drawing, the preferred form of apparatus of the invention comprises one or more troughs 10, 11, 12, supported substantially horizontally by stanchions 13, 14, 15. In the drawing, three of these troughs are shown superimposed above each other. The construction of each trough is identical. Considering the trough 10, it is pivoted at 16 to bracket 17, fixed to the stanchion 13. Cams 18, 19, rotatable with and fixed upon horizontal shafts 20, 21 bear against the lower face of the trough. A rod 22 extends through stanchion 13 and is rotatable therein. Collars 23, 24 fixed to the rod and bearing against the stanchion at either side thereof prevent endwise motion of the rod. A handwheel 25 is fixed to the rod whereby the rod may be rotated. One end of the rod is threaded through a swivel block 26 pivotally mounted in an arm 27 fixed to shaft 20. An arm 28, also fixed to shaft 20 is pivoted at 29 to one end of a link 30, the other end of which is pivoted at 31 to a similar arm 32, fixed to shaft 21. The arrangement is such that by turning the handwheel 25 the inclination of the trough 10 may be adjusted, the trough resting at all times upon cams 18, 19.

At the receiving end of the trough 10, a compartment 33 is provided having a lateral orifice 34 in alignment with the floor of the trough. A water pipe 35 connected to compartment 33 provides a supply of water which is directed through the orifice 34 along the floor of the trough.

The opposite or lower end of the trough is formed with a sump 36 having an outlet 37 at one side thereof, the outlet 37 having telescoping engagement with a drain pipe 38.

A feed belt 39 is trained about an idle pulley 40 rotatable on bracket 17. A guide roller 41 is rotatably mounted on the delivery end of the trough. The strip of rubber 42 is delivered from the extrusion machine or calender by the belt 39. It is then passed through the trough and over the idler roll 41, being propelled along the trough by the flow of water.

In order to treat the upper side of the strip a pair of spray pipes 43, 44 having spray apertures at frequent intervals therealong, are supported above the trough 10 throughout its length so as to direct their spray to the upper face of the strip. The waste water therefrom is caught by the trough.

Where it is desired to subject the strip to long continued treatment, or successive treatments at different temperatures, a plurality of superimposed troughs may be arranged as shown in the drawing and the strip leaving one trough may be delivered directly to the succeeding trough. To conserve space and to permit the troughs to be superimposed successive troughs are pivoted at opposite ends, trough 10 being pivoted at 16, trough 11 at 45, and trough 12 at 46. This permits the rubber strip 42 dropping directly from the guide roller 41 to the trough 11 and in leaving the trough 11 the strip likewise drops from a guide roll 50 to the trough 12. The strip finally leaves the trough 12 over a similar guide pulley 52 and proceeds over a conveyer belt 53 which carries the strip from the treating device.

In the operation of the device the strip 42 is propelled along the troughs entirely by the force of the current of water, the natural buoyancy of the strip assisting in relieving frictional drag of the strip on the trough as the specific gravity of rubber compositions is ordinarily not greatly in excess of that of water. The conveyer belt 53 is run at such a velocity as not to stretch the strip and due to the absence of pulling means the strip is free to shrink naturally and uniformly. The device may be used wherever shrinking, cooling, or vulcanizing operations are to be performed on the strip in the absence of tension or confining pressure.

I claim:

1. The method of treating a strip of plastic material which comprises feeding the strip in succession through a plurality of streams of fluid, propelling the strip along each stream by force of the current while changing the temperature of the strip by contact with the fluid, and reversing the strip between streams to bring the opposite faces alternately into contact with the stream.

2. Apparatus for treating a strip of plastic material, said apparatus comprising a series of troughs for controlling the flow of fluid, means for effecting a flow of fluid along each trough to propel a strip therealong, means for feeding the strip to the first trough, means for withdrawing the strip from the last trough, and means for reversing the strip between the troughs.

3. Apparatus for treating a strip of plastic material as defined by claim 2, in which the troughs are superimposed and the flow of fluid is directed in opposite directions in successive troughs to permit the strip to advance directly from trough to trough.

4. Apparatus for treating a strip of plastic material as defined by claim 2, in which additional means for supplying fluid to the surface of the strip is provided along each trough.

5. Apparatus for treating a strip of plastic material as defined by claim 2 in which spray means for supplying additional fluid to the surface of the strip is provided along each trough.

6. Apparatus for treating a strip of plastic material, said apparatus comprising a series of troughs for controlling the flow of a cooling fluid, means for effecting a flow of fluid along each trough to propel a strip therealong, means for adjusting the inclination of each trough, means for feeding a strip to the first trough, means for reversing the strip between troughs alternately to bring its opposite faces into contact with the cooling fluid, and means for withdrawing the strip from the last trough.

HARVEY L. YOUNG.